No. 896,140. PATENTED AUG. 18, 1908.
G. A. McKEEL.
ROLLER BEARING.
APPLICATION FILED AUG. 7, 1907.
2 SHEETS—SHEET 1.
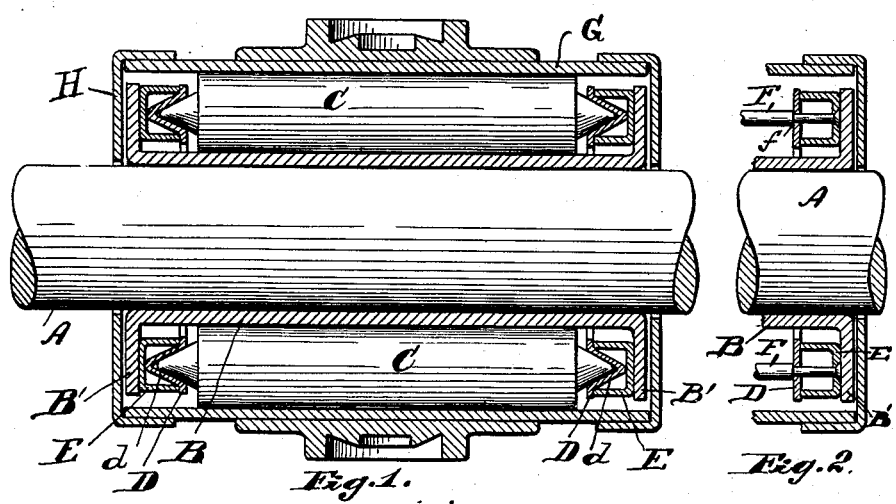
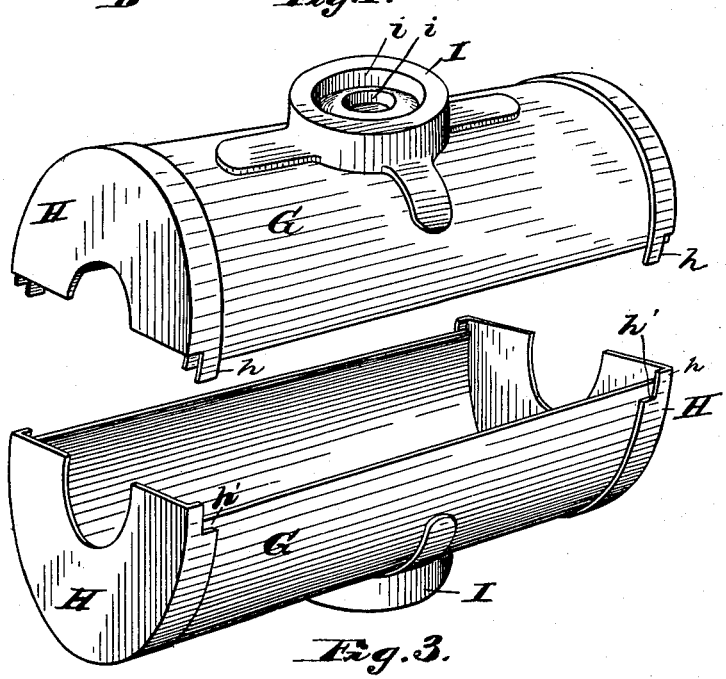
Witnesses
Lewis E. Flanders
Grace E. Wynkoop
Inventor
George A. McKeel
By S. E. Thomas
Attorney

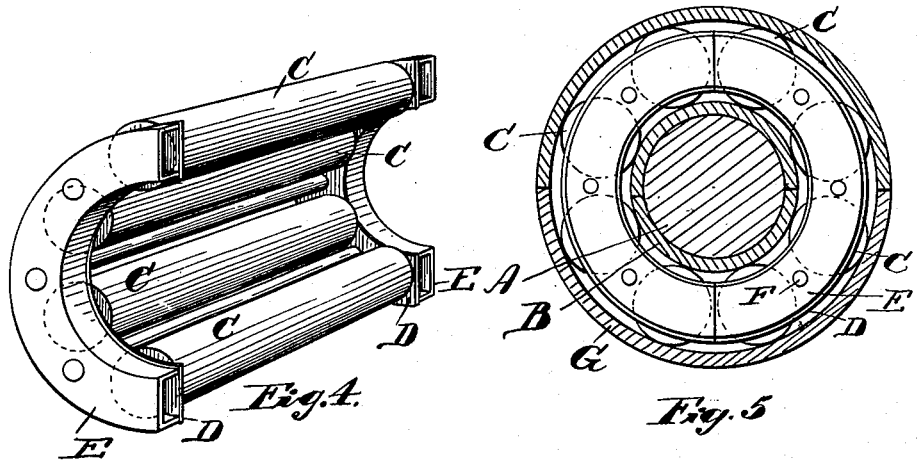
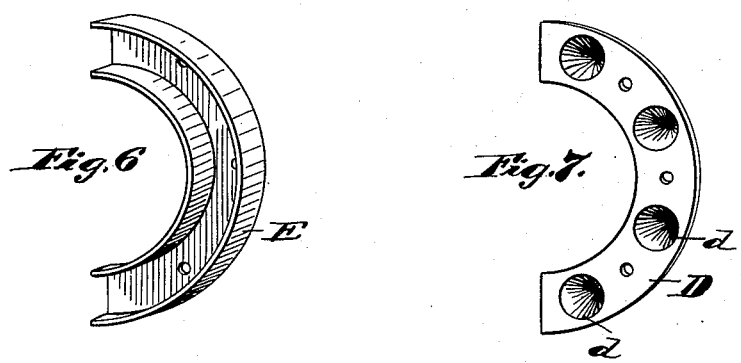
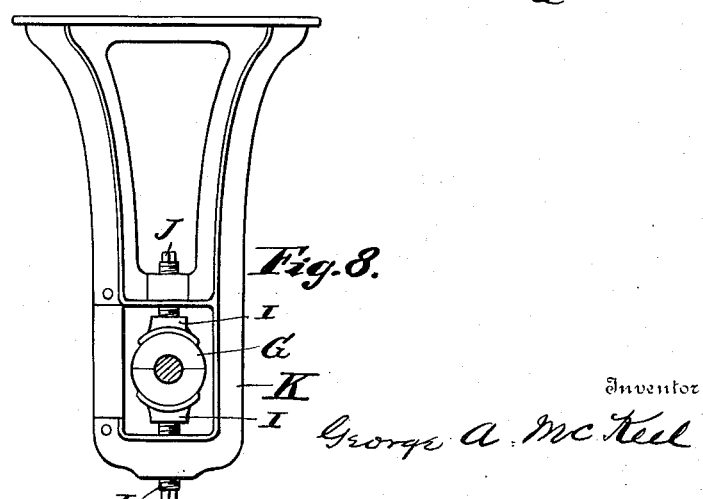

UNITED STATES PATENT OFFICE.

GEORGE A. McKEEL, OF JACKSON, MICHIGAN.

ROLLER-BEARING.

No. 896,140.  Specification of Letters Patent.  Patented Aug. 18, 1908.

Application filed August 7, 1907. Serial No. 387,416.

*To all whom it may concern:*

Be it known that I, GEORGE A. McKEEL, citizen of the United States, residing at Jackson, county of Jackson, State of Michigan, have invented a certain new and useful Improvement in Roller-Bearings, and declare the following to be a full, clear, and exact description of the same, such as will enable others skilled in the art to which it pertains to make and use the same, reference being had to the accompanying drawings, which form a part of this specification.

My invention relates to an improvement in roller bearings shown in the accompanying drawings and more particularly pointed out in the following specification and claims.

In the drawings:—Figure 1 is a longitudinal section through the bearing showing a shaft in position. Fig. 2 is a longitudinal section of a detail of the construction showing the manner of engaging together the supporting rings forming the bearing for the rolls. Fig. 3 is a perspective view of the shell inclosing the rolls, the two parts of the shell being separated to more clearly disclose the construction of the parts. Fig. 4 is a perspective view showing the rolls as they appear mounted in the semi-circular rings. Fig. 5 is a cross sectional view through the inclosing shell, with the shaft and thimble on the shaft. Fig. 6 is a perspective view of one of the semi-circular channel rings forming part of the bearing for the rolls. Fig. 7 is a perspective view of one of the semi-circular plates, which in connection with the semi-circular ring shown in Fig. 6 forms a bearing for the rolls. Fig. 8 is a shaft hanger showing the bearing in the hanger and the shaft in position.

The purpose of this invention is an improvement in the general construction of roller bearings, the main object being to construct the parts so far as possible of sheet steel in a die press, having particularly in mind a bearing which will be strong and durable, simple in construction, of few parts and easily assembled.

Referring now to the letters of reference shown in the drawings: A is the shaft, B a thimble divided longitudinally that it may be readily assembled around the shaft with which it is arranged to turn.

B' are outstanding flanges on the ends of the thimble between which is located the rolls and their bearings.

C are a plurality of rolls their ends being formed cone-shaped and supported by the cones in conical depressions d struck up in semi-circular plates D.

E is an annular channel formed of two semi-circular channel rings to which are bolted the semi-circular plates D, the cone-shaped depressions of which are lodged between the side walls of the ring E.

F are bolts smaller in diameter at each end to form a shoulder f which bears against the inner faces of the plates D, the projecting ends of the bolts extending through the wall of the channel rings E where they are rivet-headed to hold the several parts in fixed relation. As shown in Fig. 2 I prefer that the holes in the outer wall of the ring E should be counter sunk in order that when the bolts are rivet-headed they may be flush with the wall of the ring on the outside.

G is a sheet metal shell, made in semi-cylindrical form, inclosing the rolls, the ends of the shell being set in divided collars H with their inwardly projecting flanges fitting closely around the shaft. The divided collars H are electro-welded or brazed to the shells and at the ends of the dividing line are formed with tongues h designed to lap over on the other half of the collar and enter the notches h' formed in opposing portion of the collars H.

I indicates a pair of drop forgings or castings brazed or riveted to the upper and lower half of the shell G to receive the end of the set screws J mounted in the hanger K. The castings I are provided with two annular depressions i to adapt them to receive the ends of screws of larger or smaller diameter.

Having thus described my invention, what I claim is:—

1. A roller bearing comprising a thimble adapted to bear upon a shaft, channel rings bearing upon said thimble, annular plates having spaced conical sockets and bearing upon said channel rings, combined spacing and tie rods connecting said plates and channel rings, a plurality of rollers having conical end bearings engaging said sockets, a shell bearing over said rollers, and collars connected to the ends of said shell and bearing exteriorly of said thimble.

2. A roller bearing comprising a thimble having outwardly directed flanges at the ends and adapted to bear upon a shaft, channel rings bearing upon said thimble and against said flanges, annular plates having spaced conical sockets and bearing upon the inner faces of said channel rings, combined spacing and tie rods connecting said plates and channel rings and maintaining the channel rings and plates in position, a plurality of rollers having conical end bearings engaging said sockets, a shell bearing over said rollers, and collars connected to the ends of said shell and bearing against the outer faces of said thimble flanges.

3. A roller bearing comprising a divided thimble adapted to bear upon a shaft, divided semi-circular channel rings bearing upon said thimble, divided semi-circular plates having spaced conical sockets and bearing upon said channel rings, combined spacing and tie rods connecting said plates and channel rings, a plurality of rollers having conical end bearings engaging said sockets, a shell bearing over said rollers, and divided collars with interlocking means at the ends of the lines of division.

4. A roller bearing comprising a divided thimble adapted to bear upon a shaft, divided semi-circular channel rings bearing upon said thimble, divided semi-circular plates having spaced conical sockets and bearing upon said channel rings, combined spacing and tie rods connecting said plates and channel rings, a plurality of rollers having conical end bearings engaging said sockets, a shell bearing over said rollers, and divided collars with interlocking means at the ends of the lines of division.

In testimony whereof, I sign this specification in the presence of two witnesses.

GEORGE A. McKEEL.

Witnesses:
SAMUEL E. THOMAS,
GRACE E. WYNKOOP.